March 2, 1965  K. STEINBACH ET AL  3,171,621
BRAKE SYSTEM
Filed March 24, 1961  3 Sheets-Sheet 1

INVENTORS
Karl Steinbach &
Peter Wentzel
BY Georgett Spencer
ATTORNEY

INVENTORS
Karl Steinbach &
Peter Wentzel

ATTORNEY 3,171,621
BRAKE SYSTEM
Karl Steinbach, Alexandria, Va., and Peter Wentzel, Munich, Germany, assignors, by mesne assignments, to Siemens & Halske A.G., Munich, Germany
Filed Mar. 24, 1961, Ser. No. 98,086
Claims priority, application Germany, Mar. 26, 1960, T 18,126
14 Claims. (Cl. 246—182)

The present invention relates to an arrangement for controlling a car retarder or rail brake which is equipped with adjustable control elements. Such car retarders are used, for example, in control systems which release the brake when an axle group located in the brake has reached a speed which corresponds to a predetermined reference speed. The presence of such a control system, however, is not essential for purposes of the present invention. The term "axle group," as used throughout the instant application, is deemed to include a single car as well as a "cut" comprising two or more cars which are coupled together.

It is an object of the present invention to improve the safety and reliability of car retarders in switching yards, particularly in so-called humping operations, the term "hump" referring to a mound generally found in a switchyard, up one side of which the cars are pushed by an engine, and down the other side of which the cars run by gravity, the cars being switched to their proper tracks in the course of this downward run. If two axle groups which are spaced too close together roll toward a car retarder, it can happen that the trailing axle group will catch up with the leading axle group as the latter is being slowed down by the rail brake. There thus exists the danger that the first axle group which receives the impact will rise up in the track and be derailed.

According to the present invention, the car retarder or rail brake is equipped with adjustable control means which prevent the above disastrous consequences. Thus, the present invention resides, mainly, in a rail brake system which comprises a rail brake having moving means for moving the brake between braking and released positions, first signalling means arranged at a point ahead of the brake and responsive to an axle group moving past the point, second signalling means monitoring the occupancy of the brake, and logical circuit means having inputs connected, respectively, to the outputs of the first and second signalling means and an output connected to the moving means for producing a releasing signal which causes the moving means to release the brake when an axle group moves past the point at an instant at which there is an axle group in the brake.

Additional objects and advantages of the present invention will become apparent upon consideration of the following description when taken in conjunction with the accompanying drawings, in which.

Figure 1:
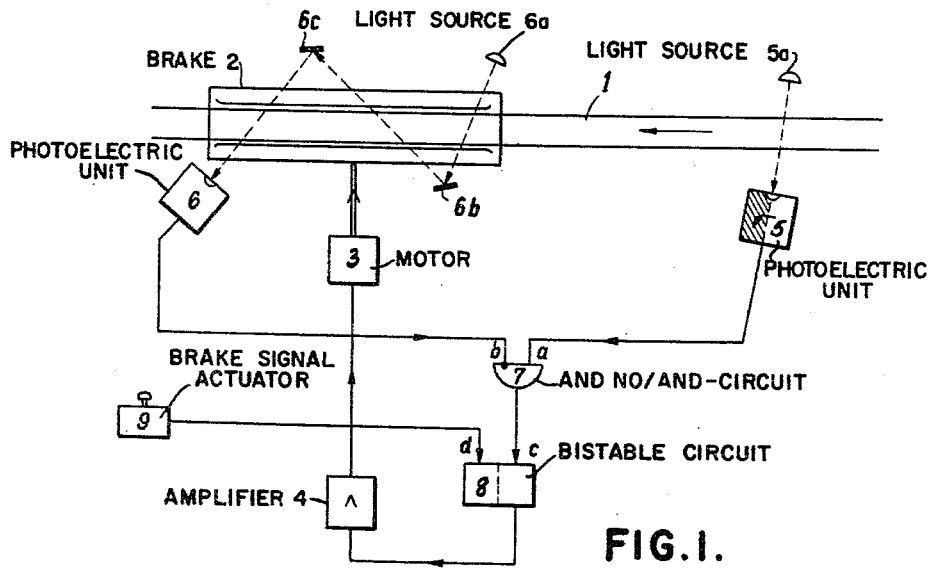
FIGURE 1 is a schematic diagram showing one embodiment of the present invention.

Referring now to the drawings, FIGURE 1 shows a track 1 along which there is arranged a car retarder or rail brake 2 having a length of, for example, 18 meters and equipped with moving means constituted by a positioning motor 3 acting on the brake shoes. The brake is released as soon as the motor 3 receives a signal from a signal amplifier 4. The cars roll down through the brake in the direction shown by the arrow.

According to the present invention, a first signalling device 5, 5a, the details of which will be described below, is arranged at a suitable distance, as, for example, 13 meters, ahead of the brake 2, and a second signalling device 6, 6a, 6b, 6c, the details of which will likewise be described below, is provided for monitoring the occupancy of the brake 2. The outputs of the two signalling devices are applied, respectively, to the inputs $a$, $b$, of a logical circuit 7, the output of which is connected to an input $c$ of a bistable circuit 8. The output of this circuit 8 is connected to the input of the amplifier 4 in such a manner that the latter will emit a control signal when the circuit 8 is brought into one of its two stable conditions by the emission from circuit 7 of an output signal, namely, a signal which will cause the brake 2 to be released. A manually operated signal generator constituted by an actuator 9 is provided, which actuator is connected to the second input $d$ of the circuit 8 for returning the latter to its other stable condition, i.e., a condition in which the release of the brake is cancelled, thereby bringing the brake back into its braking position.

In the illustrated embodiment, the first signalling device is constituted by a photoelectric system comprising a light receiver and amplifier unit 5 and a light source 5a, the unit 5 being so designed as to emit a signal only when there is a transition from illumination to non-illumination by the light from the source 5a, i.e., only when an axle group enters the section of track across which passes the light beam emanating from the light source 5a. In order that the light beam remains interrupted during the time an axle group passes through this section of track, the light beam is arranged at the height of the car bumpers and, if desired, runs in a direction which is not precisely at right angles to the length of the track. In order even further to improve the reliability of the signalling device, it can be so constituted as to respond only to those variations in the light conditions which have an effect on the unit 5 lasting for a period longer than, say, 0.25 second.

The advantage of a signalling device as thus described, as compared to known system for indicating the occupancy of a section of track, is that it can differentiate between, i.e., annunciate, closely following axle groups.

The second signalling device shown in FIGURE 1 comprises a light source 6a, a plurality, as, for example, two, reflectors 6b, 6c, and a light receiver and amplifier unit 6, the arrangement and number of reflecting mirrors being such that the light beam emanating from the light source 6a monitors the entire extent of the brake 2. The unit 6 is so designed as to produce a signal so long as there is no car in the brake 2. A further improved second signalling device will be described below.

With the units 5 and 6 being designed as described above, the logical circuit 7 will be in the form of an AND NO/AND-circuit, i.e., a circuit which emits a signal only when the following conditions occur simultaneously: (a) no signal from the second signalling device 6, and (b) a signal from the first signalling device 5. The system will then operate as follows:

Let it be assumed that the brake 2 is unoccupied and in the braking position. If an axle group now runs through the first signalling device in the direction of the arrow, the beam of light impinging on the unit 5 will be interrupted and during the transition to non-illumination of this unit, a short signal will be applied to the input $a$ of circuit 7. This signal, however, will have no effect because there is a signal being applied to the input $b$, due to the fact that the brake 2 is unoccupied. The axle group then enters the brake 2, is braked, and at the same time interrupts the light beam emanating from the light source 6a, so that no signal will be emitted from the unit 6. This, however, will not cause the circuit 7 to emit a signal, because no signal is emitted from the unit 5; this will hold true even if the length of the axle group is such as to interrupt both light beams. Also, no signal will be produced by the circuit 7 when the end of the axle group leaves the first signalling device 5 because the unit 5, as explained above, produces a signal only when changing from illumination to non-illumination, but not when changing from non-illumination to illumination.

If, however, a subsequent axle group traverses the first signalling device while the first axle group is still within the brake 2, the first signalling device 5 will emit a signal and apply the same to the input *a* of the circuit 7, whereas there is no signal being applied to the input *b* due to the fact that the brake is still occupied. The circuit 7 will therefore apply a signal to the input *c* of the bistable circuit 8 and thereby move the latter to its "release" position; this, in turn, causes a signal to be applied to the amplifier 4 which then activates the motor to cause the brake to be moved from its braking to its released position. As a result, the axle group in the brake is released, so that the following axle group will not collide with the first axle group. If, after the first axle group has left the brake, the actuator 9 is rapidly energized, a signal will be applied to the input *d* of the circuit 8, thereby bringing this circuit back to its other bistable position, namely, the "braking" position. As a result, the brake 2 will be returned to its braking position and still be able to retard the subsequent axle group.

Figure 2:
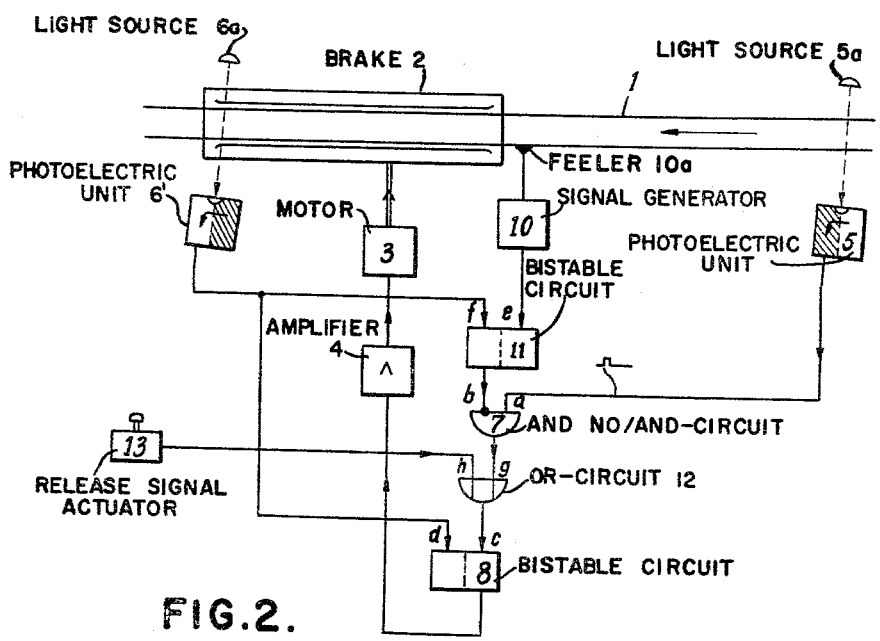
FIGURE 2 is a schematic diagram showing another embodiment of the present invention.

The embodiment of FIGURE 2 differs from the above-described one by a special arrangement of the second signalling device, the latter, in the instant embodiment, comprising the following: a photoelectric system 6′, 6a which monitors only the exit of the brake and which is so designed as to emit a short signal only when changing from non-illumination to illumination, i.e., when an axle group leaves the brake; a signal generator 10 which is arranged betwen the first signalling device 5, 5a and the brake 2, this signal generator being, for example, actuated by a rail contact or the like; and a bistable circuit 11 whose inputs *e* and *f* are connected, respectively, with the output of the signal generator 10 and the unit 6′ and whose output constitutes the output of the second signalling device and is conneced to the input *b* of the circuit 7. A signal from the signal generator 10 brings bistable circuit 11 into the first of its stable positions, namely, "entry," in which no signal appears at the output of circuit 11; a signal from the unit 6′ brings the circuit 11 into its other stable position, namely "clear," at which a signal does appear at the output of circuit 11. By orienting the light beams of the photoelectric devices 5, 5a, and 6′, 6a slightly diagonally and/or by appropriate design of these units, only the beginning and the end, respectively, of the axle groups will have any effect on the respective signalling devices.

Figure 2A:
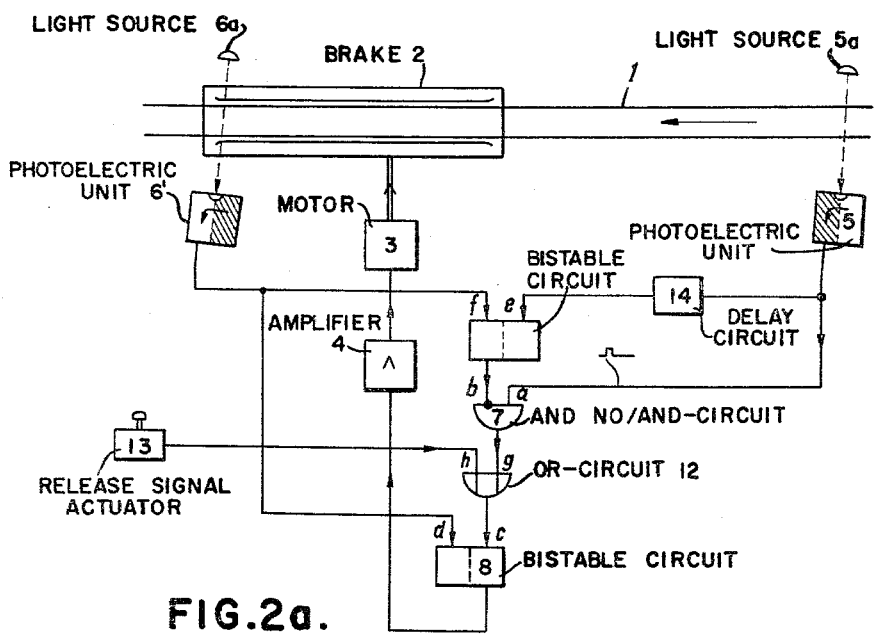
FIGURE 2a is a schematic diagram showing a variation of the embodiment of FIGURE 2.

The signal generator 10 can, if desired, be equipped with a plurality of feelers 10a, of which one is shown in FIGURE 2, these feelers being located between the first signalling device 5, 5a and the brake 2. In general, all that is important is that after the dying out of the signal from the first signalling device, the signal generator 10 produces one or more output signals so long as the axle group concerned is located between the first signalling device and the brake 2. Alternatively, the same result could be achieved if the signal generator comprises a delay circuit 14, shown in FIGURE 2a (which is otherwise identical to FIGURE 2), which delay circuit produces from the signal emitted by the unit 5 an output signal that is delayed by a time interval longer than the duration of the signal.

The arrangement shown in FIGURE 2 is combined with a control system by means of which a release signal may be produced at an instant which can be selected at will, so that the braking action can be interrupted as desired. Accordingly, the circuitry includes an OR-circuit 12 whose input *g* is connected to the output of the logical circuit 7. The other input *h* of the OR-circuit 12 is connected to a release signal generator 13, which can simply be a manually operable actuator capable of producing a signal. The output of the OR-circuit is connected to the input *c* of the bistable circuit 8, the input *d* of which is connected to the output of the above-described unit 6′.

The operation of the circuit of FIGURE 2 is as follows: Let it be assumed that the bistable circuit 8 is in the "brake" position in which the brake 2 is in its braking position, and the bistable circuit 11 is in the "clear" position. When an axle group traverses the light beam of the first signalling device, a signal will appear at the input *a* of circuit 7. This, however, will have no effect because of the signal of the bistable circuit 11 appearing at the input *b* which blocks the logical circuit 7. As soon as the signal generator is actuated by the axle group passing over the contact 10a, the bistable circuit 11 is brought into its other or "entry" position by way of input *e* so that the signal produced by the second signalling device 6′, 10, 11 disappears at the input *b* of the circuit 7; at that instant, however, there will likewise be no signal at the input *a*. When the effect of the brake 2 has reduced the speed to the desired value, the actuator 13 is energized. Consequently, a signal will appear at the input *h* of the OR-circuit 12 and therefore also at the input *c* of the bistable circuit 8, which last-mentioned signal brings the circuit into the "release" position, thereby causing the brake 2 to be released via the amplifier 4 and the motor 3. Due to the above-described characteristics of the signalling device 6′, an axle group interrupting the light beam emanating from the source 6a will not produce a signal. When, however, the axle group rolling out of the brake 2 clears the signalling device 6′, 6a, there will appear a signal at the output of the latter, which signal will (*a*) move the bistable circuit 11 to its "clear" position by way of input *f* and (*b*) return the bistable circuit 8, by way of its input *d*, into the "brake" position. As a result, the release signal disappears at the output of circuit 8 so that the brake is immediately brought back into the braking position and is thus ready to reduce the speed of the next axle group.

Between the actuation of the signal generator 10, 10a, by the incoming axle group and the clearing of the photoelectric device 6′, 6a, upon the leaving of the axle group from the brake 2, the bistable circuit 11 will be in its "entry" position, so that there will be no signal at the input *b* of the circuit 7. Thus, if within this time interval a second axle group enters the first signalling device 5, 5a, the signal produced thereby causes, by way of the input *a* of the circuit 7, an output to appear at this last-mentioned circuit. This signal reaches the input *c* of the bistable circuit 8 by way of the OR-circuit 12, thereby bringing the circuit 8 into its "release" position; as a result, the brake is immediately released by way of the amplifier 4 and the motor 3.

Let it now be assumed that the second axle group is already in the process of entering the brake 2 at a time when the first axle group has not as yet cleared the brake. This means that even after the first axle group has left the brake, the latter is not actually clear, i.e., unoccupied, but remains occupied but now by the second axle group. Therefore, if the photoelectric device 6′, 6a were a signal generator which could, as has heretofore been the case, differentiate only between "occupied" and "not occupied" (cf., the second signalling device described above in connection with FIGURE 1), it would not be possible, in the instant example, to utilize the signal taken from the second signalling device for the purpose of returning the brake to its braking position. This would mean that the second axle group would roll through the brake without being retarded thereby.

It will be appreciated from the above that the use of a photoelectric device such as the device 6′, 6a, which monitors only the exit of the brake and which emits a signal only when changing from non-illumination to illumination, is able to produce special advantages. In particular, the arrangement shown in FIGURE 2, in contradistinction to known occupancy monitors, is able to differentiate between two axle groups which are in the brake at the same time. The photoelectric device does not emit a signal whenever the heretofore occupied brake is cleared, but rather then when a cut leaves the brake. This signal acts via the input d of the circuit 8 to return the latter to its "brake" position so as to return the brake to its braking position; as a result, a subsequent axle group will be braked even if it enters the brake at a time when the first axle group is still in the brake.

Figure 3:
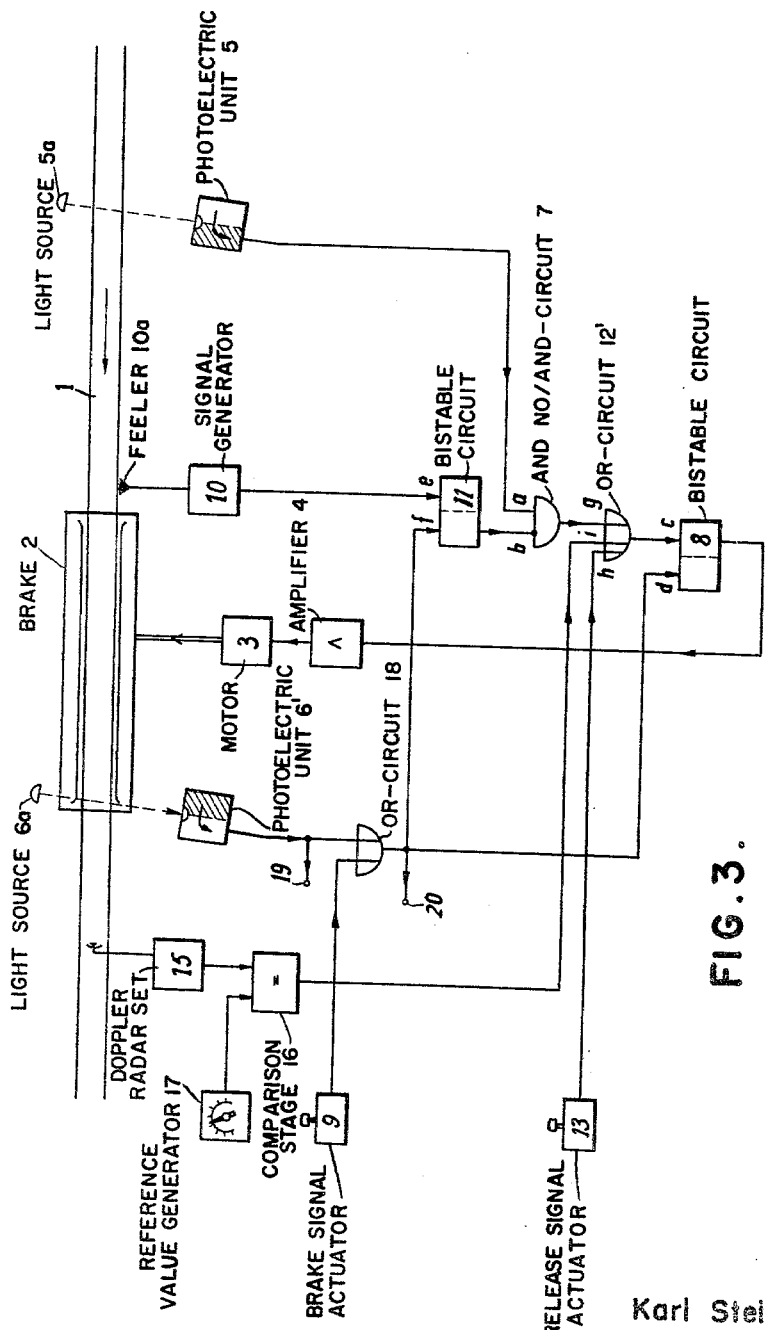
FIGURE 3 is a schematic diagram showing yet another embodiment of the present invention.

FIGURE 3 shows a system similar to FIGURE 2 but including a control arrangement by means of which a release signal can be obtained manually as well as by means of a speed-responsive device. The latter includes a speed measuring device in the form of a Doppler radar set 15 aranged behind the brake 2, which set produces an output value that is a function of the speed of the axle group in the brake. The control arrangement further comprises a comparison stage 16 one input of which is connected to the output of the radar set 15 and the other input of which is connected to a reference value generator 17, which may be manually adjustable, this generator producing a value corresponding to the speed at which the brake is to be released. If desired, the reference value may be produced by a computer which calculates the reference value taking into consideration such factors as rolling characteristics of the particular axle group, the length and characteristics of the path to be covered by the axle group, and the like. The comparison stage 16 is so designed that it produces at its output a releasing signal as soon as the difference between the input value becomes zero; the output of the comparison stage 16 is connected to an additional input i of the OR-circuit 12'.

FIGURE 3 also shows an OR-circuit 18 interposed between the output of the unit 6', the other input of this OR-circuit 18 being connected to a manually operated brake signal generator so that the effects produced by actuation of the photoelectric unit 6', 6a, may be produced by actuation of the actuator 9. This actuator 9 is actuated, for example, at the beginning of the operation in order to bring the bistable circuits 8 and 11 into the "brake" and "clear" positions, respectively.

Inasmuch as the photoelectric unit 6', 6a, which belongs to the second signalling device gives an unequivocal indication as to when an axle group, which has been braked up to now, leaves the brake, the output signal of this photoelectric unit can also be used to control additional functions of an automatic brake control arrangement. For example, the speed measuring device 15 can be shut off for a short time interval the duration of which is a function of the speed measured by the radar set and which lasts until the axle group leaving the brake has left the radiation pattern of the antenna. Such further applications are indicated schematically by terminals 19 and 20.

It is evident that the above description of FIGURE 3, particularly when taken in conjunction with the operation as described above in connection with FIGURE 2, suffices to enable an understanding of the operation of FIGURE 3.

The individual component parts of the above-described system, each taken by itself, do not form part of the present invention. The various electronic circuits are shown, for example, in "Pulse and Digital Circuits," by Millman and Taub, McGraw-Hill Book Company, Inc., 1956. The binary circuits, corresponding to components 8 and 11, are conventional and as described, for example, on page 156, section 5–7, undergo the unsymmetrical triggering explained thereat. The comparison stage, corresponding to component 16, may be of the type described on pages 458 to 484, particularly pages 458 and 459, it being assumed that $E_R=0$. The other circuit components including the various logic circuits, are also in accordance with conventional electrical engineering principles. The same applies to the photoelectric units whose outputs may be in the form of D.C. potentials which appear when a car enters the field monitored by the respective units; this output signal may be as shown, for example, on page 48, FIGURE 2–22(a) which, after differentiation, appears as depicted in FIGURE 2–22(b). As explained, for example, on page 111, FIGURE 4–7, the pulses of one polarity may be suppressed by means of a diode, so that final output signals of the photoelectric unit will be as described above.

It will be understood that the above description of the present invention is susceptible to various modifications, changes and adaptations, and the same are intended to be comprehended within the meaning and range of equivalents of the appended claims.

We claim:
1. A rail brake system, comprising, in combination: a rail brake having moving means for moving said brake between braking and released positions; first signalling means arranged at a point ahead of said brake and responsive to an axle group moving past said point, said first signalling means having an output; second signalling means monitoring the occupancy of said brake, said second signalling means having an output; and a logical circuit having inputs connected, respectively, to said outputs of said first and second signalling means and an output connected to said moving means for producing a releasing signal which causes said moving means to release said brake when an axle group moves past said point at an instant at which there is an axle group in said brake.

2. A system as defined in claim 1 further comprising an OR-circuit one input of which is connected to the output of said logical circuit and the other input of which is connected to an actuator enabling said releasing signal to be produced at any desired instant.

3. A system as defined in claim 2 wherein said actuator comprises a speed measuring device responsive to the speed of an axle group in said brake for producing said releasing signal when said axle group attains a predetermined speed.

4. A system as defined in claim 2 wherein said OR-circuit has yet another input which is connected to a manually operable signal generator.

5. A system as defined in claim 1 wherein said first signalling means comprise: a photoelectric unit which produces an output signal only when changing from illumination to non-illumination and therefore only when an axle group commences to move past said point.

6. A system as defined in claim 1 wherein said second signalling means comprise: a photoelectric unit which monitors only the exit of said brake and produces an output signal only when changing from non-illumination to illumination and therefore only when an axle group has cleared said brake; a signal generator for producing at least one output signal after the dying out of an output signal from said first signalling means and so long as there is an axle group between said point and said brake; and a bistable circuit which is brought into one of its stable positions by an output signal from said photoelectric unit and into the other of its stable positions by a signal from said signal generator, said bistable circuit having an output which is connected to the respective input of said logical circuit.

7. A system as defined in claim 6 wherein said signal generator comprises at least one feeler arranged between said point and the entrance of said brake.

8. A system as defined in claim 6 wherein said signal generator comprises a delay circuit for delaying the output signal of said first signalling means such as to produce a delayed output signal which is time-delayed by an interval longer than the duration of the output signal.

9. A system as defined in claim 1 wherein said signalling means each comprise photoelectric units.

10. A system as defined in claim 9 wherein at least one of said photoelectric units is so designed as to respond only to changes in illumination which last longer than a predetermined duration.

11. A system as defined in claim 10 wherein said predetermined duration is of the order of approximately 0.25 second.

12. A system as defined in claim 6 and further comprising a second bistable circuit having a first input, a second input, and an output, wherein the output of the photoelectric unit of said second signalling means is further fed to said first input of said second bistable circuit, said second input of said second bistable circuit being controlled by the output signal of said logical circuit, said output of said second bistable circuit causing said moving means to move said brake back to braking position in response to a signal from said photoelectric unit.

13. A system as defined in claim 12 wherein the output of said photoelectric unit is connected to the input of an OR-circuit whose output is connected to said first input of said second bistable circuit, the other input of said OR-circuit being connected to a manually operable actuator.

14. A system as defined in claim 6, further comprising output means connected to the output of the photoelectric unit of said second signalling device for controlling additional functions of an automatic brake control arrangement.

References Cited by the Examiner
UNITED STATES PATENTS

| | | | |
|---|---|---|---|
| 1,875,839 | 9/32 | Alexander et al. | 246—182 X |
| 2,076,955 | 4/37 | Livingston | 246—182 |

FOREIGN PATENTS

| | | |
|---|---|---|
| 208,415 | 5/57 | Australia. |

EUGENE G. BOTZ, *Primary Examiner.*

JAMES S. SHANK, LEO QUACKENBUSH,
*Examiners.*